(12) United States Patent
Chen et al.

(10) Patent No.: US 6,993,229 B2
(45) Date of Patent: Jan. 31, 2006

(54) METHOD OF MAKING SPUN OPTICAL FIBER WITH LOW PMD

(75) Inventors: Xin Chen, Corning, NY (US);
Ming-Jun Li, Horseheads, NY (US);
Jesse C. Meyer, Avon, CT (US); Oscar Palmer, Leland, NC (US)

(73) Assignee: Corning Incorporated, Corning, NY (US)

( * ) Notice: Subject to any disclaimer, the term of this patent is extended or adjusted under 35 U.S.C. 154(b) by 193 days.

(21) Appl. No.: 10/676,290

(22) Filed: Sep. 30, 2003

(65) Prior Publication Data

US 2005/0069267 A1 Mar. 31, 2005

(51) Int. Cl.
*G02B 6/02* (2006.01)
*G02B 6/16* (2006.01)

(52) U.S. Cl. .................................. 385/123; 65/402
(58) Field of Classification Search ................ None
See application file for complete search history.

(56) References Cited

U.S. PATENT DOCUMENTS

| | | | |
|---|---|---|---|
| 5,298,047 A | 3/1994 | Hart, Jr. et al. | 65/3.11 |
| 5,418,881 A * | 5/1995 | Hart et al. | 385/123 |
| 5,704,960 A * | 1/1998 | Evans et al. | 385/28 |
| 5,943,466 A | 8/1999 | Henderson et al. | 385/123 |
| 6,148,131 A | 11/2000 | Geertman | 385/123 |
| 6,189,343 B1 | 2/2001 | Cocchini et al. | 65/430 |
| 6,240,748 B1 | 6/2001 | Henderson et al. | 65/402 |
| 6,430,346 B1 * | 8/2002 | Conradi et al. | 385/123 |
| 2001/0020374 A1 | 9/2001 | Roba et al. | 65/402 |
| 2002/0026813 A1 | 3/2002 | Blaszyk et al. | 65/402 |
| 2003/0152348 A1 | 8/2003 | Chen et al. | 385/123 |
| 2004/0017986 A1 * | 1/2004 | Garner et al. | 385/123 |
| 2004/0081412 A1 * | 4/2004 | Cocchini et al. | 385/104 |

FOREIGN PATENT DOCUMENTS

| | | |
|---|---|---|
| EP | 1 384 700 A2 | 1/2004 |
| GB | 2 101 762 A | 1/1983 |
| WO | WO 83/00232 | 1/1983 |
| WO | WO 97/30945 | 8/1997 |
| WO | WO 02/03115 | 1/2002 |
| WO | WO 04/078665 | 9/2004 |

OTHER PUBLICATIONS

Li et ano., "Fiber spin-profile designs for producing fibers with low polarization mode dispersion," *Optics Letters*, Nov. 1, 1998, vol. 23, No. 21, pp. 1659-1661.

Chen et al., "Polarization mode dispersion of spun fibers: an analytical solution," *Optics Letters*, vol. 27, No. 5, pp. 294-296.

Chen et al., "Scaling properties of polarization mode dispersion of spun fibers in the presence of random mode coupling," *Optics Letters*, Sep. 15, 2002, vol. 27, No. 18, pp. 1595-1597.

Galtarossa, et al., "Optimized Spinning Design for Low PMD Fibers: An Analytical Approach," *Journal of Lightwave Technology*, vol. 19, No. 10, pp. 1502-1512.

\* cited by examiner

*Primary Examiner*—Frank G. Font
*Assistant Examiner*—James P. Hughes
(74) *Attorney, Agent, or Firm*—Joseph M. Homa

(57) ABSTRACT

An optical fiber, and a method of making such optical fiber, wherein the optical fiber exhibits a beatlength greater than about 0.5 meters, and the fiber is spun to provide a polarization mode dispersion in the spun state of said fiber which is less than 0.05 ps/km$^{1/2}$. The fiber is spun by employing a spin having a spin repeat distance of at least 1 meter and a plurality of varying spin reversal distances occurring within the spin repeat distance. The spin preferably alternates between clockwise and counterclockwise directions.

16 Claims, 10 Drawing Sheets

METHOD OF MAKING SPUN OPTICAL FIBER WITH LOW PMD

BACKGROUND OF THE INVENTION

1. Field of the Invention

The invention relates to a method of manufacturing an optical fiber, whereby a fiber is drawn from a molten extremity of an optical fiber preform and is subsequently subjected to a torque, thereby causing a portion of the fiber to be twisted about its longitudinal axis and to be endowed with a spin. More particularly, the invention relates to an optical fiber of this type having low polarization mode dispersion.

2. Technical Background

Light traveling in an optical fiber has two polarization modes. For optical fibers that are perfectly circularly symmetric in both geometry and internal and applied stress, operation at a wavelength or in a wavelength range which is regarded as "single-moded" actually supports two orthogonal polarization modes, wherein the two polarization modes are degenerate, propagate with the same group velocity and have no time delay after traveling the same distance in the fiber. However, in practice, optical fibers are not perfectly circularly symmetric. For example, imperfections such as geometric and form deformation and stress asymmetry break the degeneracy of the two modes. See, for example, Rashleigh, S. C., Journal of Lightwave Technology, LT-1: 312–331, 1983. As a result, the two polarization modes propagate with different propagation constants $\beta_1$ and $\beta_2$. The difference between the propagation constants is termed birefringence $\delta\beta$, the magnitude of the birefringence being given by the difference in the propagation constants of the two orthogonal modes:

$$\delta\beta = \beta_1 - \beta_2 \quad (1)$$

Birefringence causes the polarization state of light propagating in the fiber to evolve periodically along the length of the fiber. The distance required for the polarization to return to its original state is the fiber beat length $L_B$, which is inversely proportional to the fiber birefringence. In particular, the beat length $L_B$ is given by:

$$L_B = \frac{2\pi}{\delta\beta} \quad (2)$$

Accordingly, fibers with more birefringence have shorter beat lengths and vice versa. Commercial fibers exhibit a wide variety of beat lengths since the geometric and stress asymmetries of such fibers vary along the length of the fiber and between different fibers. Typical beat lengths observed in practice range from as short as 2–3 millimeters (a high birefringence fiber) to as long as 10–100 meters (a low birefringence fiber).

In addition to causing periodic changes in the polarization state of light traveling in a fiber, the presence of birefringence means that the two polarization modes travel at different group velocities, the difference increasing as the birefringence increases. The differential time delay between the two polarization modes is called polarization mode dispersion, or PMD. PMD causes signal distortion, and thus PMD is very detrimental in high bit rate systems and analog communication systems. For a uniform linear birefringent fiber without perturbation, i.e. externally imposed perturbation, the PMD of the fiber increases linearly as the fiber length increases. However, in a longer length, random mode coupling is inevitably introduced into the fiber due to externally imposed perturbations, and statistically the PMD increase along the fiber is thus proportional to the square-root of the fiber length.

A known method of combating PMD is to deliberately spin the warm fiber as it is drawn from the preform, so that a mechanical spin becomes "frozen" into the fiber as it cools. The resulting rotation of the birefringence axis in the fiber produces continual mode-coupling between the orthogonal polarization modes of a carried signal, thereby inhibiting the accumulation of a significant phase lag between the two modes, and consequently causing a significant reduction in the fiber's PMD.

A method as specified in the opening paragraph is known from United States patent U.S. Pat. No. 6,324,872, wherein the drawn fiber is caused to pass over a roller whose rotational axis can be canted, so that the pulley can be caused to rock back and forth about an axis perpendicular to its rotational axis. The rocking motion of the roller produces a twist in the fiber along a substantial portion of its length. In particular, portions of warm fiber which are twisted in this manner will become endowed with a permanent twist (spin) as their constituent material subsequently cools.

The cited document stipulates that the spin imparted to the fiber ideally has a non-constant spatial frequency. This can be achieved by canting the pulley back and forth in a non-periodic manner. In this way, the described method aims to achieve a PMD of less than 0.5 ps/km$^{1/2}$.

However, the known methods for spinning optical fiber to reduce PMD have some deficiencies. For example, the quality with which optical fiber is being manufactured today is becoming increasingly improved. Consequently, even some unspun fiber now has the capability of exhibiting a PMD less than 0.1 ps/km$^{1/2}$. Unfortunately, prior art spinning methods have not been completely successful in reducing this already low level of PMD which is existent in some of today's manufactured single mode fibers to even lower levels.

SUMMARY OF THE INVENTION

The present invention relates to a novel and convenient method for making optical fiber, that can be used to produce fiber having low PMD, for example on the order of less than 0.05 ps/km$^{1/2}$, more preferably less than 0.03 ps/km$^{1/2}$, even more preferably less than 0.02 ps/km$^{1/2}$, and most preferably less than 0.01 ps/km$^{1/2}$. More specifically, the inventive method comprises providing a conventional optical fiber preform, heating at least a portion of the preform to a conventional draw temperature in a hot zone of a draw furnace, and drawing optical fiber from the heated preform in such a way that a spin is impressed on the fiber. In other words, a torque is applied to the fiber such that the fiber is caused to twist around its longitudinal axis with a resulting torsional deformation of the fiber material in the hot zone. A spin is "impressed" on the fiber herein if fiber material in the hot zone is caused to be torsionally deformed, with that deformation being fixed in the fiber, such that the fiber exhibits a permanent "spin", i.e. a permanent torsional deformation.

The methods of the present invention are especially applicable to single mode fibers having a beat length greater than 0.5 meters. Likewise, the methods of the present invention are applicable to single mode fibers having a beat length greater than 1 meter, greater than 5 meters, greater than 10 meters and even greater than 20 or 50 meters. Also, the methods of the present invention are applicable to single mode fibers having a PMD less than 0.05 ps/km$^{1/2}$ in the unspun state.

In one set of preferred embodiments, an optical fiber is disclosed herein exhibiting a beat length greater than about 0.5 meters, having a longitudinal axis with a spin impressed on the fiber, wherein over at least a portion of the fiber the spin impressed on the fiber is alternately clockwise and counter-clockwise, with a spin repeat distance of at least 1 meter and with a plurality of varying spin reversal distances occurring within the spin repeat distance, wherein the plurality of varying spin reversal distances comprises a minimum spin reversal distance and a maximum spin reversal distance.

In one preferred embodiment, the fiber exhibits a beat length of between 0.5 m and 5 m, the spin repeat distance is greater than about 10 m, and the resultant PMD from the spin impressed on the fiber is less than 0.1 ps/km$^{1/2}$. In another preferred embodiment, the fiber exhibits a beat length of between 0.5 m and 5 m, the spin repeat distance is greater than about 10 m, and the resultant PMD from the spin impressed on the fiber is less than 0.05 ps/km$^{1/2}$. In yet another preferred embodiment, the fiber exhibits a beat length of less than 5 m, the spin repeat distance is greater than about 100 m, and the resultant PMD from the spin impressed on the fiber is less than 0.05 ps/km$^{1/2}$. In still another preferred embodiment, the fiber exhibits a beat length of greater than 5 m, the spin repeat distance is greater than about 100 m, and the resultant PMD from the spin impressed on the fiber is less than 0.03 ps/km$^{1/2}$. In another preferred embodiment, the fiber exhibits a beat length of greater than 1 m, the spin repeat distance is greater than about 200 m, and the resultant PMD from the spin impressed on the fiber is less than 0.02 ps/km$^{1/2}$.

In another set of preferred embodiments, a method of making an optical fiber is disclosed herein, the method comprising: heating at least a portion of an optical fiber preform; and drawing optical fiber from the heated preform such that a spin is impressed on the fiber by applying a torque to the fiber, said torque causing the fiber to undergo rotation around longitudinal axis of the fiber such that the spin is impressed on the fiber as it is drawn from the preform, wherein the optical fiber has a beat length greater than about 0.5 meters, and at least a portion of the spin impressed on the fiber is alternately clockwise and counter-clockwise with a spin repeat distance of at least 1 meter and a plurality of varying spin reversal distances occurring within the spin repeat distance, wherein the plurality of varying spin reversal distances comprises a minimum spin reversal distance and a maximum spin reversal distance.

Preferably, the minimum spin reversal distance is greater than 10 cm, more preferably greater than 0.25 m, and even more preferably greater than 0.5 m.

The maximum spin reversal distance is a fraction of the spin repeat distance. In one preferred embodiment, the ratio of the maximum spin reversal distance divided by the spin repeat distance is less than 0.5. In another preferred embodiment, the ratio of the maximum spin reversal distance divided by the spin repeat distance is less than 0.25.

Preferably, the spin repeat distance is greater than 1 m. In a preferred embodiment, the spin repeat distance is between 1 m and 2 km. In another preferred embodiment, the spin repeat distance is between 1 m and 1 km.

In a preferred embodiment, the spin impressed on the fiber over the spin repeat distance has substantially constant magnitude. In another preferred embodiment, the spin impressed on the fiber over the spin repeat distance has substantially variable magnitude.

Preferably, the magnitude of the spin impressed on the fiber over the spin repeat distance is greater than about 0.25 turns/meter, more preferably greater than about 0.5 turns/meter. In a preferred embodiment, the magnitude of the spin impressed on the fiber over the spin repeat distance is between about 0.25 turns/meter and 30 turns/meter. In another preferred embodiment, the magnitude of the spin impressed on the fiber over the spin repeat distance is between about 0.5 turns/meter and 20 turns/meter.

In a preferred embodiment, the spin impressed on the fiber is symmetric over the spin repeat distance, and preferably having a cumulative spin in one direction substantially equal to the cumulative spin in the other direction. Preferably, the spin impressed on the fiber is symmetric between the spin imparted in the clockwise direction and the spin imparted in the counter-clockwise direction.

In one preferred embodiment, the spin repeat distance is greater than about 10 m and the beat length of the fiber is greater than 0.5 m. In another preferred embodiment, the spin repeat distance is greater than about 10 m and the beat length of the fiber is between about 0.5 and 5 m. In another preferred embodiment, the spin repeat distance is greater than about 100 m and the beat length of the fiber is greater than about 1 m. In yet another preferred embodiment, the spin repeat distance is greater than about 100 m and the beat length of the fiber is greater than about 10 m. In still another preferred embodiment, the spin repeat distance is greater than about 100 m and the beat length of the fiber is greater than about 20 m. In yet another preferred embodiment, the spin repeat distance is greater than about 200 m and the beat length of the fiber is greater than about 1 m.

In one preferred embodiment, a single mode fiber disclosed herein which exhibits a beat length of greater than 5 m, the spin repeat distance is greater than about 100 m, and the resultant PMD from the spin impressed on the fiber is less than 0.01 ps/km$^{1/2}$. In another preferred embodiment, a single mode fiber is disclosed herein which exhibits a beat length of greater than 10 m, the spin repeat distance is greater than about 50 m, and the resultant PMD from the spin impressed on the fiber is less than 0.01 ps/km$^{1/2}$.

Utilizing the methods of the present invention, a number of advantages can be achieved over the prior art. The method is especially valuable for imparting a low PMD to optical fibers which are single-moded at wavelengths ranging from 1300 to 1625, and most preferably single-moded at around 1550 nm. Consequently, the invention is also embodied in a novel type of low PMD single mode fiber, and in articles (e.g. an optical fiber communications systems) that comprise such fiber. For example, previously unheard of low levels of PMD can be consistently achieved on a long beat length (greater than 5 meters, more preferably greater than 10 meters) single mode fibers. For example, PMD as low as 0.05, more preferably less than 0.03, even more preferably less than 0.02, and most preferably less than 0.01 ps/km$^{1/2}$ on the fiber in the spun state, can be achieved, on such fibers using the methods disclosed herein.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION OF THE INVENTION

To describe the PMD reduction, we define a parameter called PMD reduction factor, which is the ratio of the PMD of spun fiber ($\tau$) to that of the same fiber in the unspun state ($\tau_0$):PMDRF=$\tau/\tau_0$ For example, if PMDRF is 1.0, there is no improvement (i.e. no reduction) in fiber PMD, while a PMDRF of 0.2 implies that the PMD has been improved by a factor of 5.

Applicants have discovered that PMD reduction performance is related to fiber beatlength and which type of fiber spinning technique is used. When the frequency modulated spinning techniques disclosed herein are used, the PMD of fibers with various beatlengths can be dramatically reduced. However, when applying the same technique to fibers with shorter beatlength (for example, a fiber of beatlength of less than 0.5 meter), the PMD reduction can be much less effective.

Figure 1:
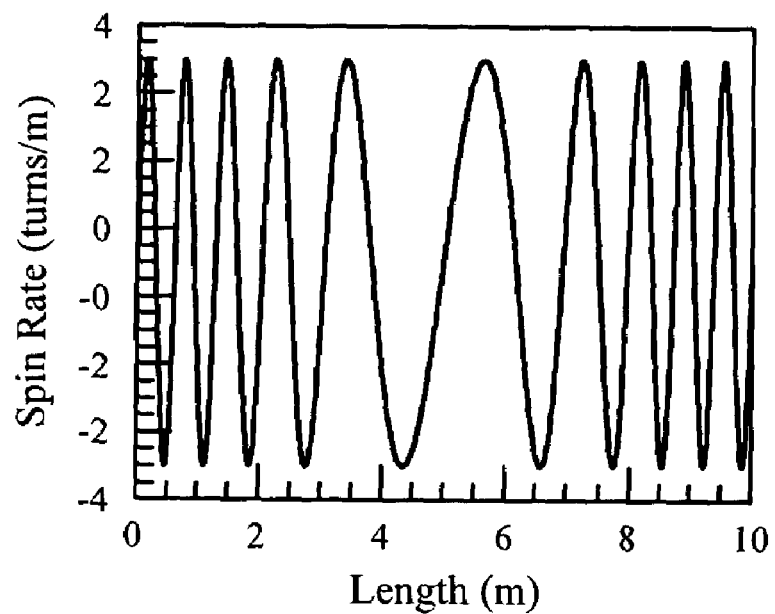
FIG. 1 illustrates a frequency modulated spin profile as disclosed herein, the plot showing spin rate as a function of distance along the length of an optical fiber.

FIG. 1 illustrates a frequency modulated spin profile as disclosed herein, the plot showing spin rate (normalized) as a function of distance along the length of an optical fiber. The minimum spin reversal distance (or minimum local peak to peak separation) is about 0.7 m, the maximum spin reversal distance (or maximum local peak to peak separation) is about 2.3 m, and the spin repeat distance is about 10 m. In the embodiment shown in FIG. 1, the same peak magnitude is shared by all of the local maxima and local minima.

The frequency modulated spin (rate) profile illustrated in FIG. 1 takes the form of, $$\alpha(z)=\alpha_0 \sin(2\pi(z/\Lambda_0+\gamma \sin(2\pi z/\Lambda_m))) \qquad (3)$$

where $\alpha_0$ is the spin magnitude, in revolutions/m (or turns/m), $\Lambda_0$ is the period without the modulation, $\gamma$ is the modulation parameter which controls the strength of the modulation, and $\Lambda_m$ is another modulation parameter, which controls the modulation period and the actual spin repeat distance of the whole spin profile. In FIG. 1, $\alpha_0$=3.0 turns/m, $\Lambda_0$=1 m, $\gamma$=1.0, and $\gamma_m$=10 m.

Figure 2:
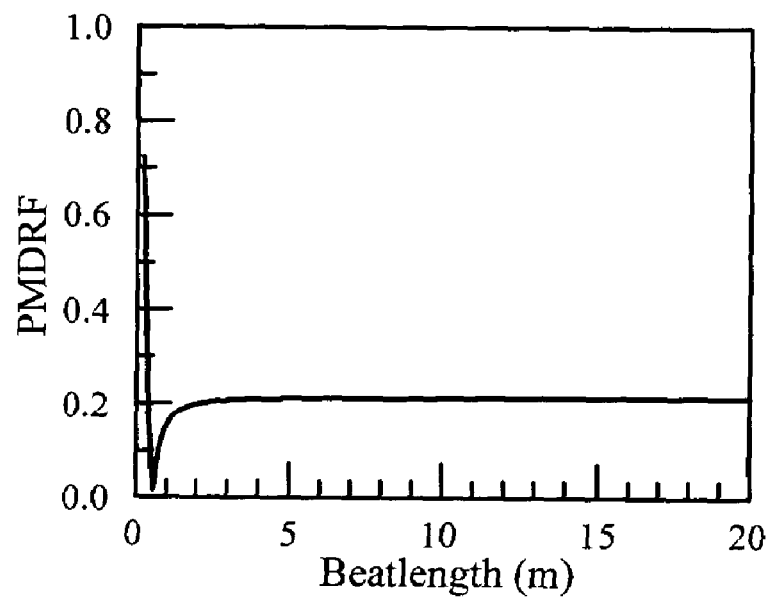
FIG. 2 illustrates the PMDRF for fibers of various beat lengths subjected to the spin profile of FIG. 1.

FIG. 2 illustrates the PMDRF for fibers of various beat lengths subjected to the spin profile of FIG. 1. As seen in FIG. 2, PMDRF is less than or equal to about 0.16 for fibers with beatlengths greater than 1 m, and PMDRF is substantially not dependent on (or, is substantially independent of) beatlength for beatlengths longer than about 5 m.

While beat lengths of approximately 1 meter were common in what was considered good quality optical fiber in the early to middle 1990's, subsequent manufacturing processes have enabled routine, consistent achievement of optical fibers having beat lengths greater than 10 meters or more. FIG. 2 illustrates that the frequency modulated spinning technique disclosed herein achieves effective PMD reduction for fiber beat length longer than about 0.5 m, but does not achieve the same amount of PMD reduction for fibers having shorter beat lengths. Thus, the frequency modulated spinning techniques disclosed herein have an extremely beneficial effect on PMD for high beat length fibers.

Figure 3:
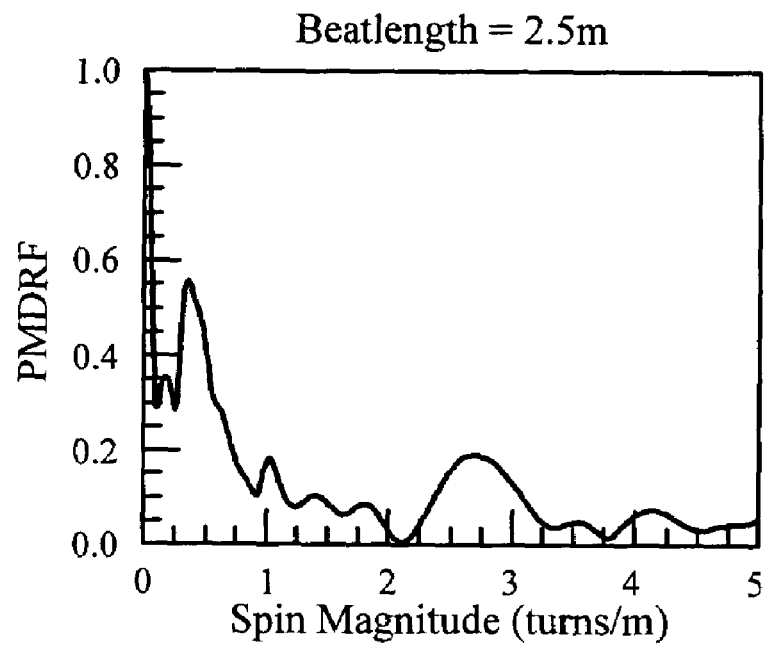
FIG. 3 illustrates the dependence of PMDRF on spin magnitude for the spin profile of FIG. 1 applied to optical fibers having a beat length of 2.5 m.
Figure 4:
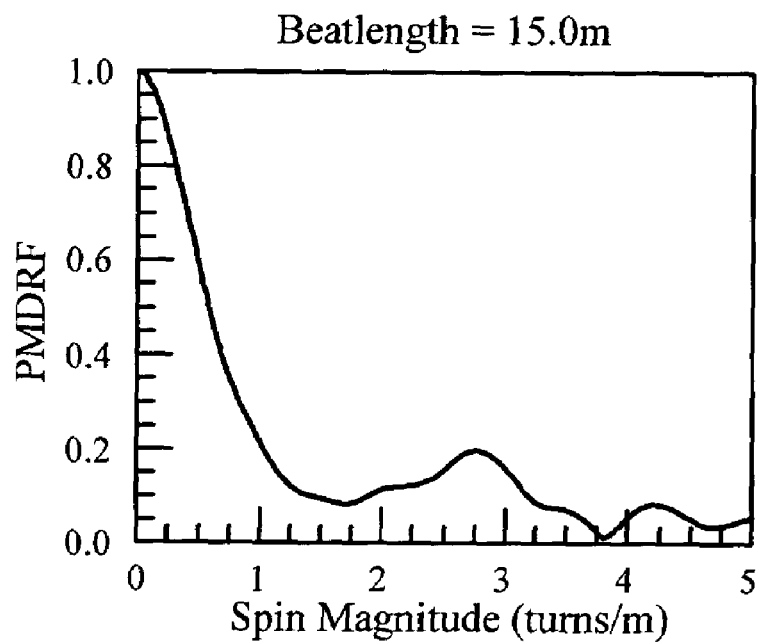
FIG. 4 illustrates the dependence of PMDRF on spin magnitude for the spin profile of FIG. 1 applied to optical fibers having a beat length of 15.0 m.

FIGS. 3 and 4 illustrate the dependence of PMDRF on spin magnitude for the spin profile of FIG. 1 applied to optical fibers having a beat length of 2.5 m and 15.0 m, respectively. FIGS. 3 and 4 show a decreasing dependence on spin magnitude for spin magnitudes greater than about 1 turn/meter. Referring to FIGS. 3 and 4, PMDRF is less than about 0.2 for spin magnitude between about 1 and 5 turns/meter, and PMDRF is less than about 0.1 for spin magnitude between about 3 and 5 turns/meter, as well as for spin magnitude larger than 5 turns/meter.

Figure 5:
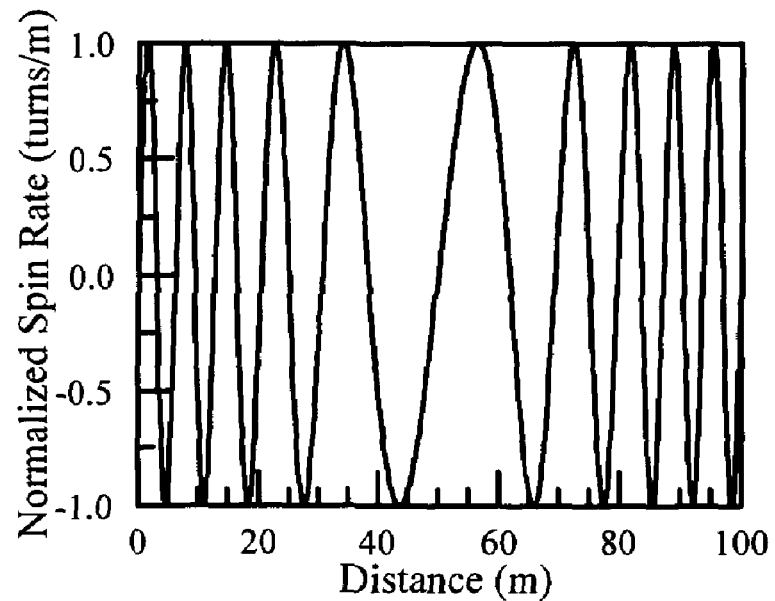
FIG. 5 illustrates another frequency modulated spin profile as disclosed herein, the plot showing spin rate as a function of distance along the length of an optical fiber.

FIG. 5 illustrates another frequency modulated spin profile as disclosed herein, the plot showing normalized spin rate as a function of distance along the length of an optical fiber. The minimum spin reversal distance is about 6 m, the maximum spin reversal distance is about 23 m, and the spin repeat distance is about 100 m. The peak magnitude shared by all of the local maxima and local minima in the spin profile is 3 turns/meter.

The frequency modulated spin (rate) profile illustrated in FIG. 5 takes the same form of Equation (3), with $\alpha_0=3.0$ turns/m, $\Lambda_0=10$ m, $\gamma=1$, and $\Lambda_m=100$ m.

Figure 6:
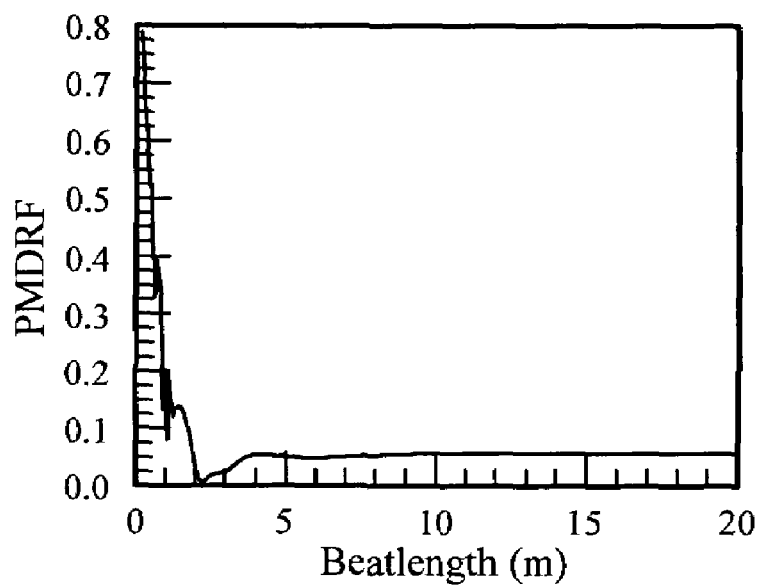
FIG. 6 illustrates the PMDRF for fibers of various beat lengths subjected to the spin profile of FIG. 5.

FIG. 6 illustrates the PMDRF for fibers of various beat lengths subjected to the spin profile of FIG. 5. As seen in FIG. 6, PMDRF is less than or equal to about 0.1 for fibers with beatlengths greater than 1.8 m, and PMDRF is less than or equal to about 0.07 for fibers with beatlength greater than 2 m. PMDRF is substantially not dependent on (or, is substantially independent of) beatlength for beatlengths longer than about 4 m.

Figure 7:
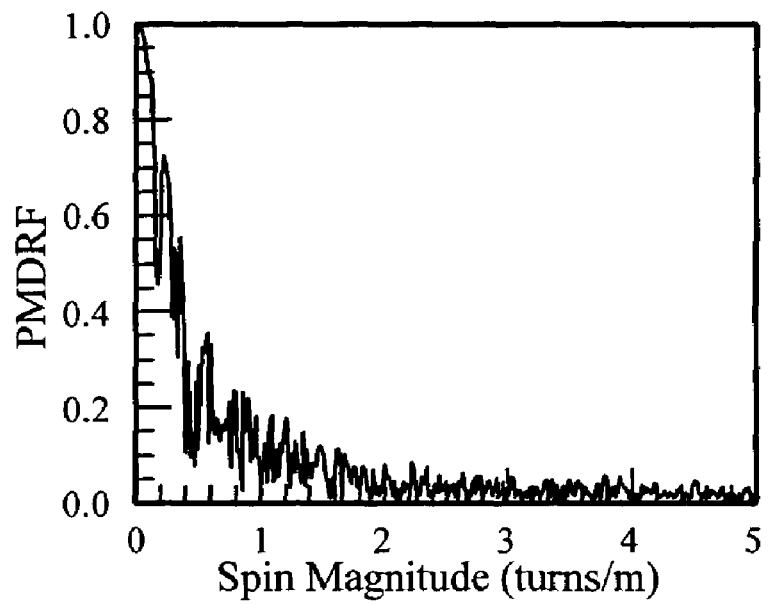
FIG. 7 illustrates the dependence of PMDRF on spin magnitude for the spin profile of FIG. 5 applied to optical fibers having a beat length of 2.5 m.
Figure 8:
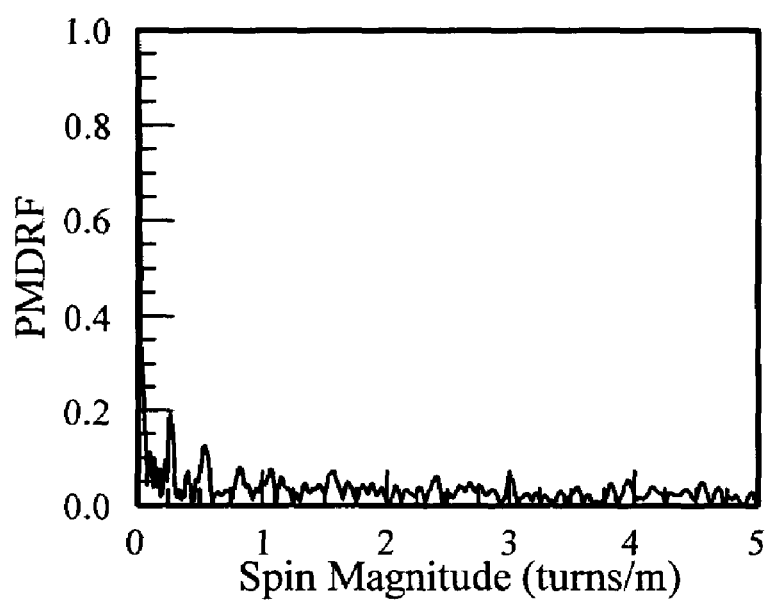
FIG. 8 illustrates the dependence of PMDRF on spin magnitude for the spin profile of FIG. 5 applied to optical fibers having a beat length of 15 m.

FIGS. 7 and 8 illustrate the dependence of PMDRF on spin magnitude for the spin profile of FIG. 5 applied to optical fibers having a beat length of 2.5 m and 15.0 m, respectively. FIGS. 7 and 8 show a decreasing dependence on spin magnitude. Referring to FIG. 7, PMDRF is less than about 0.2 for spin magnitude greater than about 1 turn/meter, and less than about 0.1 for spin magnitude greater than about 2 turn/meter. Referring to FIG. 8, PMDRF is less than about 0.2 for spin magnitude greater than about 0.5 turn/meter, and less than about 0.1 for spin magnitude greater than about 0.75 turn/meter.

Figure 9:
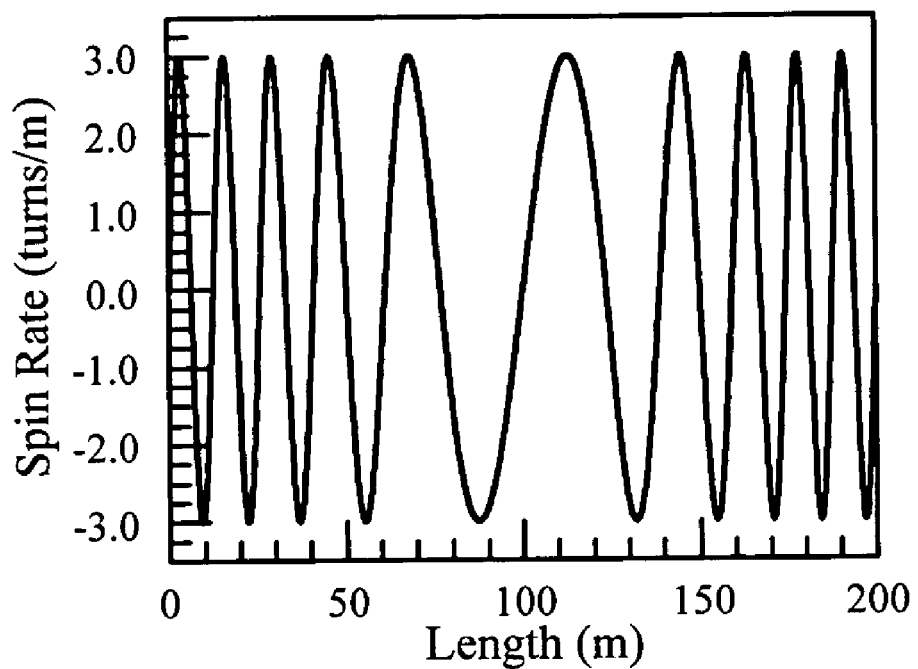
FIG. 9 illustrates another frequency modulated spin profile as disclosed herein, the plot showing spin rate as a function of distance along the length of an optical fiber.

FIG. 9 illustrates another frequency modulated spin profile as disclosed herein, the plot showing normalized spin rate as a function of distance along the length of an optical fiber. The minimum spin reversal distance is about 12.5 m, the maximum spin reversal distance is about 44 m, and the spin repeat distance is about 200 m. The frequency modulated spin (rate) profile illustrated in FIG. 9 takes the form of Equation (3) above, with $\alpha_0=3.0$ turns/m, $\Lambda_0=20$ m, $\gamma=1$, and $\Lambda_m=200$ m.

Figure 10:
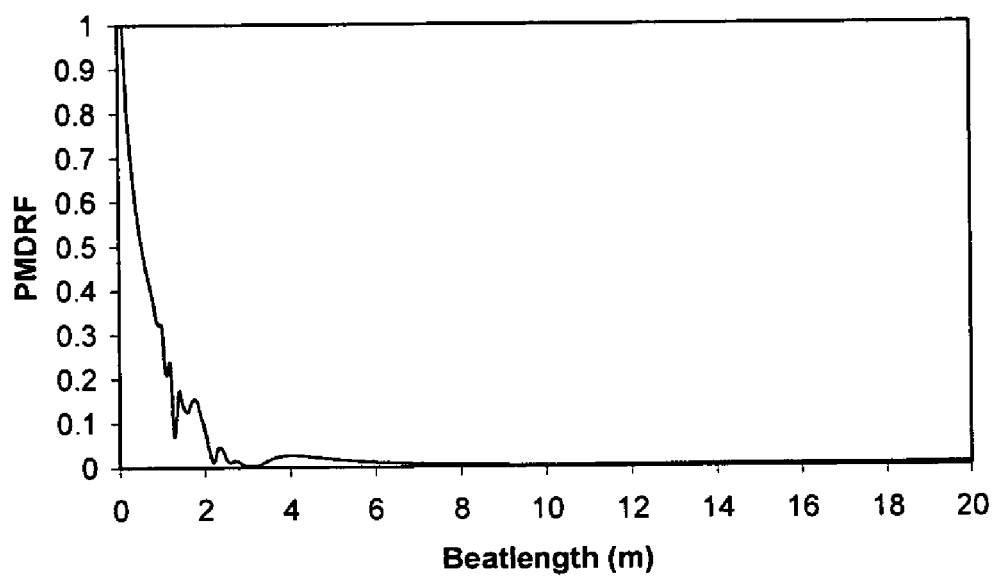
FIG. 10 illustrates the PMDRF for fibers of various beat lengths subjected to the spin profile of FIG..

FIG. 10 illustrates the PMDRF for fibers of various beat lengths subjected to the spin profile of FIG. 9 with a spin magnitude, or spin amplitude, of 3 turns/meter. As seen in FIG. 10, PMDRF is less than or equal to about 0.2 for fibers with beatlengths greater than about 1.5 m, PMDRF is less than or equal to about 0.1 for fibers with beatlengths greater than about 2 m, and PMDRF is less than or equal to about 0.05 for fibers with beatlength greater than 2.5 m. PMDRF is substantially not dependent on (or, is substantially independent of) beatlength for beatlengths longer than about 4 m.

Figure 11:
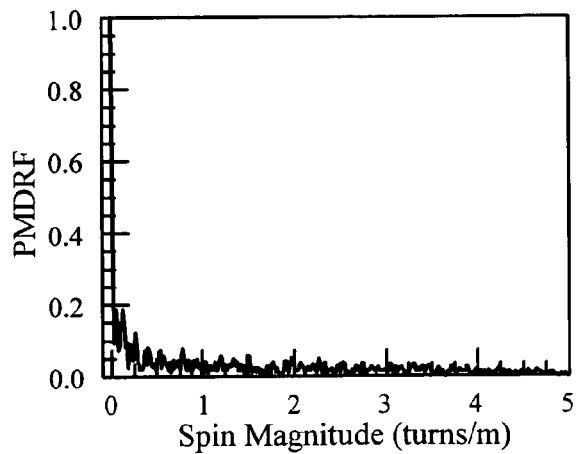
FIG. 11 illustrates the dependence of PMDRF on spin magnitude for the spin profile of FIG. 9 applied to optical fiber having a beat length of 20 m.

FIG. 11 illustrates the dependence of PMDRF on spin magnitude for the spin profile of FIG. 9 applied to optical fiber having a beat length of 20 m. FIG. 11 shows a decreasing dependence on spin magnitude, where PMDRF is less than about 0.1 for spin magnitude greater than about 0.5 turn/meter, less than about 0.05 for spin magnitude greater than about 1 turn/meter, and less than about 0.035 for spin magnitude greater than about 2 turn/meter.

Figure 12:
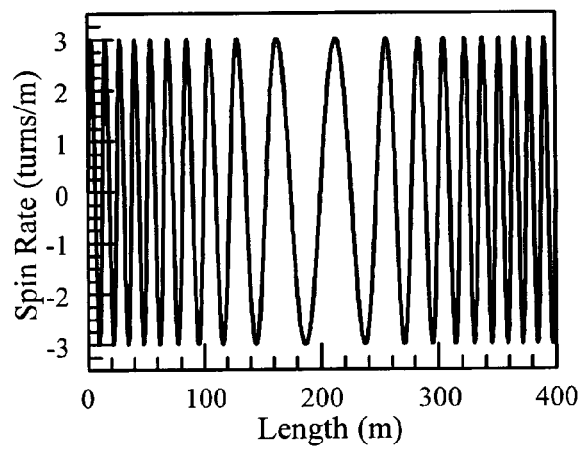
FIG. 12 illustrates another frequency modulated spin profile as disclosed herein, the plot showing spin rate as a function of distance along the length of an optical fiber.

FIG. 12 illustrates another frequency modulated spin profile as disclosed herein, the plot showing spin rate as a function of distance along the length of an optical fiber. The minimum spin reversal distance is about 12.5 m, the maximum spin reversal distance is about 50 m, and the spin repeat distance is about 400 m. The frequency modulated spin (rate) profile illustrated in FIG. 12 takes the form of Equation (3) above, with $\alpha_0=1$ turn/m, $\Lambda_0=20$ m, $\gamma=2$, and $\Lambda_m=400$ m.

Figure 13:
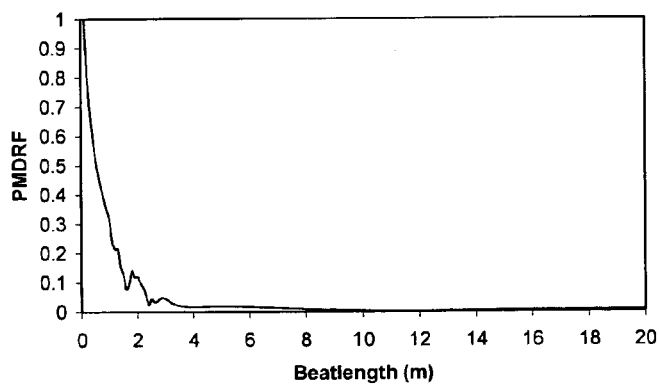
FIG. 13 illustrates the PMDRF for fibers of various beat lengths subjected to the spin profile of FIG. 12.

FIG. 13 illustrates the PMDRF for fibers of various beat lengths subjected to the spin profile of FIG. 12 with a spin magnitude, or spin amplitude, of 3 turns/meter. As seen in FIG. 13, PMDRF is less than or equal to about 0.2 for fibers with beatlengths greater than about 1.5 m, PMDRF is less than or equal to about 0.1 for fibers with beatlengths greater than about 2.5 m, and PMDRF is less than or equal to about 0.05 for fibers with beatlength greater than 3 m. PMDRF is substantially not dependent on (or, is substantially independent of) beatlength for beatlengths longer than about 4 m.

Figure 14:
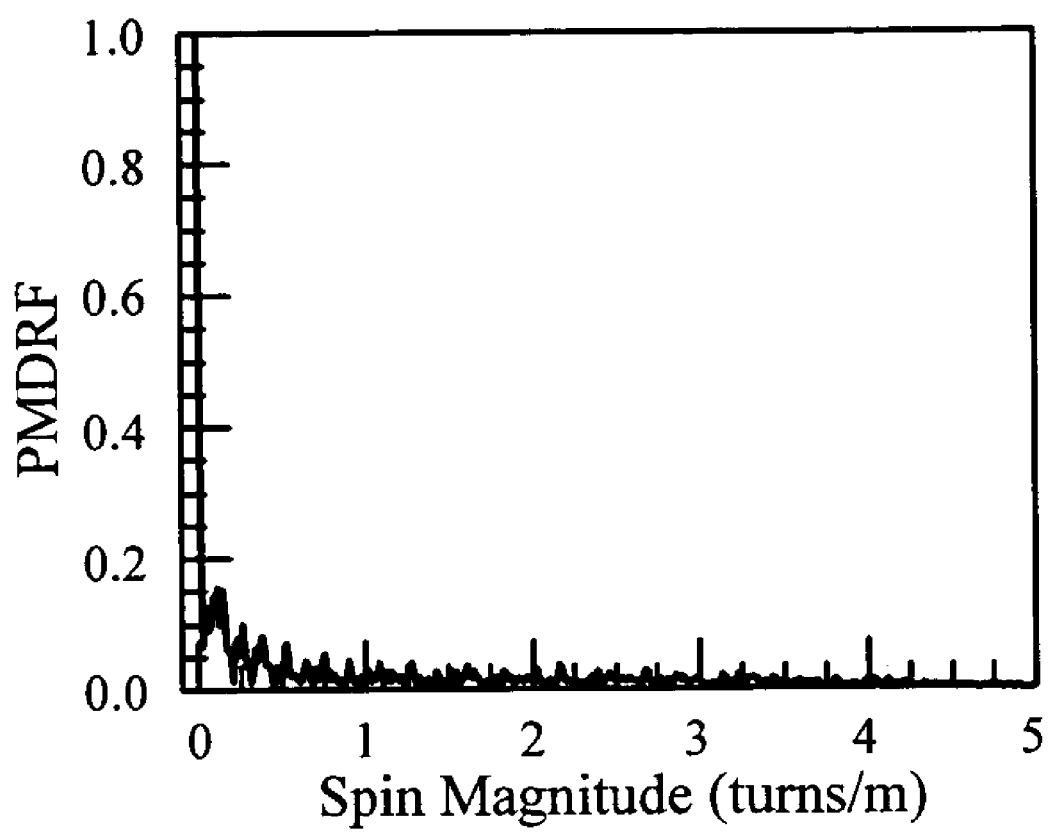
FIG. 14 illustrates the dependence of PMDRF on spin magnitude for the spin profile of FIG. 12 applied to optical fiber having a beat length of 20 m.

FIG. 14 illustrates the dependence of PMDRF on spin magnitude for the spin profile of FIG. 12 applied to optical fiber having a beat length of 20 m. FIG. 14 shows a decreasing dependence on spin magnitude, where PMDRF is less than about 0.1 for spin magnitude greater than about 0.5 turn/meter, less than about 0.05 for spin magnitude greater than about 1 turn/meter, and less than about 0.022 for spin magnitude greater than about 2 turn/meter.

Figure 15:
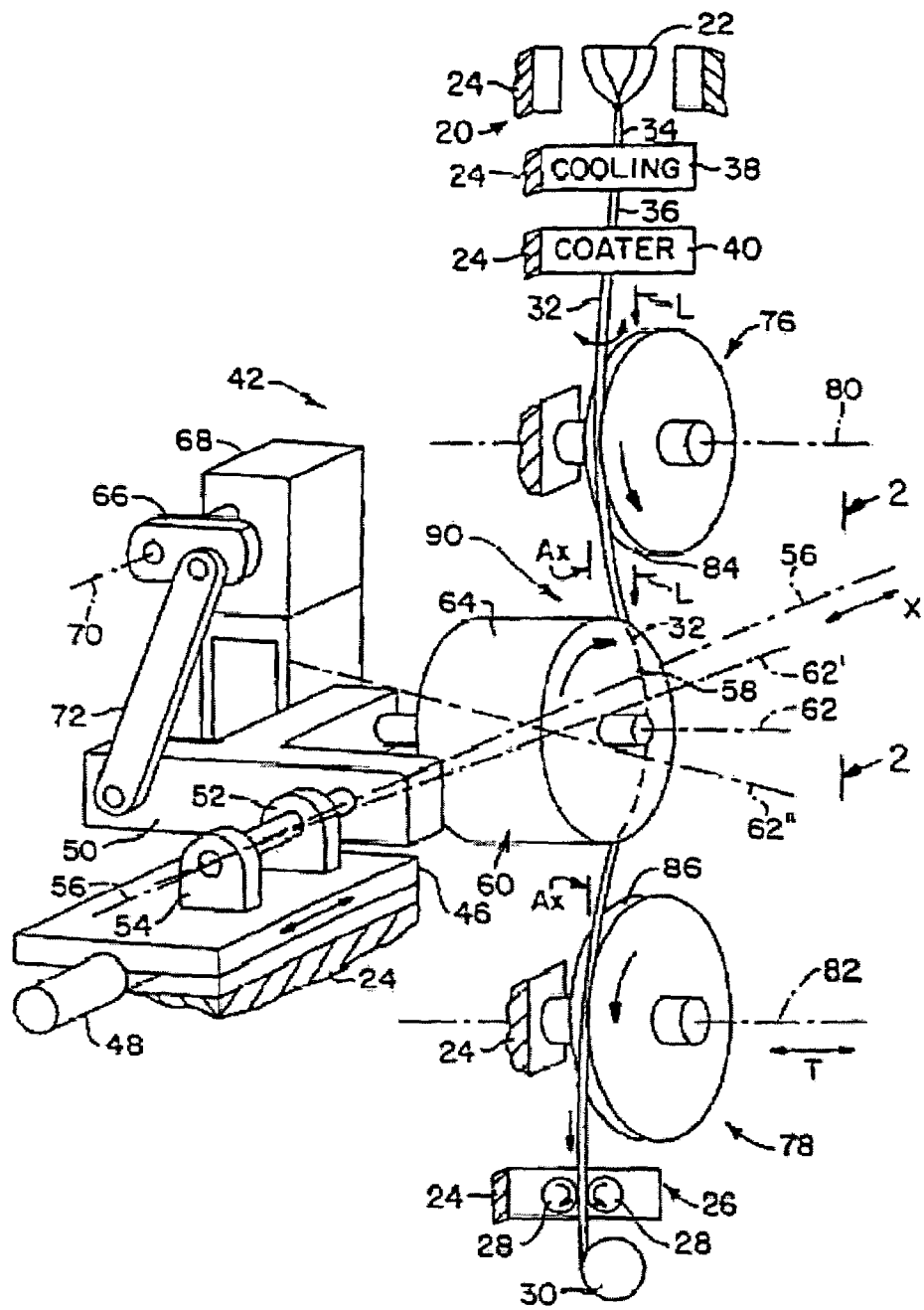
FIG. 15 is an illustration of a fiber spinning apparatus which may be employed to carry out the methods of the present invention.

Any apparatus which is capable of spinning the fiber during the fiber drawing process and is also capable of varying the frequency of the spin (and optionally the amplitude of the spin) may be used to carry out the methods of the present invention. FIG. 15 illustrates such an apparatus which is capable of producing the spin functions disclosed herein to impart the desired spin to the optical fiber. Referring to FIG. 15, furnace 20 is adapted to hold a preform 22 of the type commonly utilized in optical fiber drawing procedures. Furnace 20 is mounted to a frame 24 which defines the fixed frame of reference of the drawing system. Frame 24, for example, may be the frame of a building in which the fiber drawing operation is conducted. A takeoff or pulling stand 26 having a pair of opposed draw rollers 28 is provided downstream of furnace 20. Stand 26 includes conventional elements (not shown) as such electromechanical drive systems for turning rollers 28 about their axes so as to draw a fiber engaged therebetween. A takeup reel 30 is also provided. The takeup reel is also driven by conventional equipment (not shown) in rotation about an axis fixed relative to frame 24 so as to wind fiber from stand 26 onto the reel. Furnace 20 is arranged to maintain at least a portion of preform 22 in a soft, substantially molten condition. Stand 26 is arranged to pull a fiber 32 from the molten portion of preform 22 so that the fiber passes along a substantially predetermined path.

In a hot zone or melt zone 34 adjacent the upstream end of the path, the fiber is substantially molten. However, as the fiber moves downstream along the path, it is cooled and solidified so that when the fiber reaches a point 36 considerably downstream from furnace 20, the fiber has cooled to a substantially solid state. The region of the path extending from point 36 to the downstream end of the path is referred to herein as the "solid region" of the path. Cooling devices 38 may be provided between the melt zone and the solid zone. Desirably, the cooling device provides non-contact cooling, such that no solid object touches the surface of the fiber while it cools.

A coating device 40 is also mounted to frame 24 in solid zone 36. The coating device is adapted to apply a polymeric coating on the outside of the fiber. Preferably, the coating device is also a non-contact device. That is, the fiber passes through coater 40 without contacting or engaging any other solid object. Suitable non-contact coaters are disclosed, for example, in U.S. Pat. No. 4,792,347. The foregoing elements of the apparatus may be of conventional design as commonly utilized in the optical fiber drawing art. The apparatus may further include additional guide rollers (not shown) adjacent to downstream end of path 32, for diverting the fiber and hence the path from a straight line and for further constraining the fiber in the path. Other conventional elements such as quality testing equipment and the like may also be included.

The spin-forming apparatus includes an adjustable carriage slidably mounted to frame 24 for movement in cross-path directions X transverse to the longitudinal direction of path 32. A micrometer adjustment device 48 is provided for moving the carriage in the cross-path directions and for locking the carriage in place once the same has been adjusted to the desired location relative to frame 24. A yoke 50 is mounted to carriage 46 by a shaft 52 and bearings 54 so that yoke 50 is pivotable relative to carriage 46 and hence relative to frame 24 about a rocking axis 56 extending in the cross-path directions X and intersecting path 32 at a point of intersection 58.

Spin-imparting assembly 42 further includes a cylindrical first roller 60 mounted to yoke 50 for rotation about a first element axis 62. Roller 60 has a circumferential surface 64 encircling first element axis 62 and coaxial therewith. The frame of a motor 68 is mounted to carriage 46. A crank 66 is supported on the shaft of motor 68 so that the motor can turn crank 66 around an axis 70 parallel to the rocking axis 56. A connecting rod 72 has one end pivotally connected to crank 66 remote from its axis 70 and has the opposite end pivotally connected to yoke 50 remote from rocking axis 56. Thus, rotation of crank 66 about crank axis 70 will drive yoke 50 in a rocking motion about rocking axis 56 between a first extreme position in which the roller axis or first element axis 62 is tilted to the position indicated in broken lines at 62' in FIG. 15 and a second extreme position in which the roller axis or first element axis 62 is tilted in the opposite direction to the position shown in broken lines at 62" in FIG. 15. Extreme positions 62' and 62" are disposed at equal but opposite extreme tilt angles E1 and E2 from a nominal position 62 in which the roller axis or first element axis is perpendicular to the longitudinal direction of path 32. In all positions of the roller including these extreme positions, however, the roller axis 62 remains generally transverse to the longitudinal direction of the path. Desirably, each extreme angle E is between about 2 and about 10 degrees from nominal position. As further, discussed below, the desired angle depends upon the desired amount of spin to be imparted to the fiber. The angles E may be adjusted by adjusting the dimension of crank 66 and particularly, the spacing between the pin joint of connection rod 72 and axis 70. The speed of rotation of motor 68 determines the rate at which the yoke 50 and first element 60 will rock between the two extreme positions. Motor 68 may be an adjustable speed device such as a stepper motor driven by a digital control system of the conventional type, a DC motor driven by an adjustable voltage source, an air motor driven by an adjustable gas source, or any other conventional variable-speed motor. Alternatively, motor 68 may be fixed-speed device. Such spinning devices are further described in U.S. Pat. No. 6,324,872, the specification of which is hereby incorporated by reference.

Apparatus other than that shown in FIG. 15 can be used in the practice of the invention. See, for example, U.S. Pat. No. 4,509,968, which describes apparatus for rotating a fiber about its axis as it is being formed, as well as U.S. Pat. Nos. 5,298,047; 5,897,680; 5,704,960; and 5,943,466. In general terms, the spinning apparatus typically will include fiber-contacting means for applying a spinning force to a fiber, e.g., a roller, and drive means for moving the fiber-contacting means in a non-sinusoidal spatial pattern as a function of time, e.g., a computer-controlled drive motor and associated mechanical linkage for defining the motion of the fiber-contacting means.

Additional mechanisms for practicing the methods of the invention will be evident to persons skilled in the art from the disclosure herein, e.g., mechanisms for sinusoidal or non-sinusoidal spinning of a preform, when such preform spinning is used alone or in combination with applying a spinning force to a fiber.

The spin repeat distance employed herein is preferably at least 5 meters, more preferably 10 meters, even more preferably at least 20 meters, still more preferably at least 50 meters, yet still more preferably at least 100 meters, and even more preferably at least 200 meters, although applicants believe that the upper limit to the period in which the spin pattern is repeated is not limited, and thus, the spin repeat distance period could be as long as 400 meters or more.

The PMD reduction using frequency modulated spinning is also insensitive to typical process variation. Typical process related variations include the variation of spin magnitude during the fiber drawing process, fluctuation of fiber beatlength along the fiber, and offset in spin magnitude (as evidenced by an upward or downward shift in the magnitude versus distance plot). For example, the amount of spin and resulting spin magnitude suffer from some inevitable fluctuations because the fiber spin is enforced by the friction force between the running fiber and a wobble wheel, and such variation can at times be as large as ±0.5 revolutions/m.

The frequency modulated spin profiles employed herein can be of any periodic shape. Preferably, the spin profile employed to impart the frequency modulated spin is of a periodic shape wherein the fiber is spun first clockwise and then counter-clockwise. The periodic spin profile is also preferably a symmetric spin profile, wherein the magnitude of the maximum spin rate in the counter-clockwise direction is at least substantially equal to the magnitude of the spin rate of the fiber when spun in the clockwise direction. The shape of the periodic spin profile could be any shape, including but not limited to sinusoidal, triangular, trapezoidal or other periodic spin functions with variable spacing between local peaks in magnitude. The most preferred spin profile employed herein is a sinusoidal spin profile which is symmetric in the magnitude of the spin rate of the clockwise and counter-clockwise directions described by Equation (3) above. However, other spin profiles could be employed.

Figure 16:
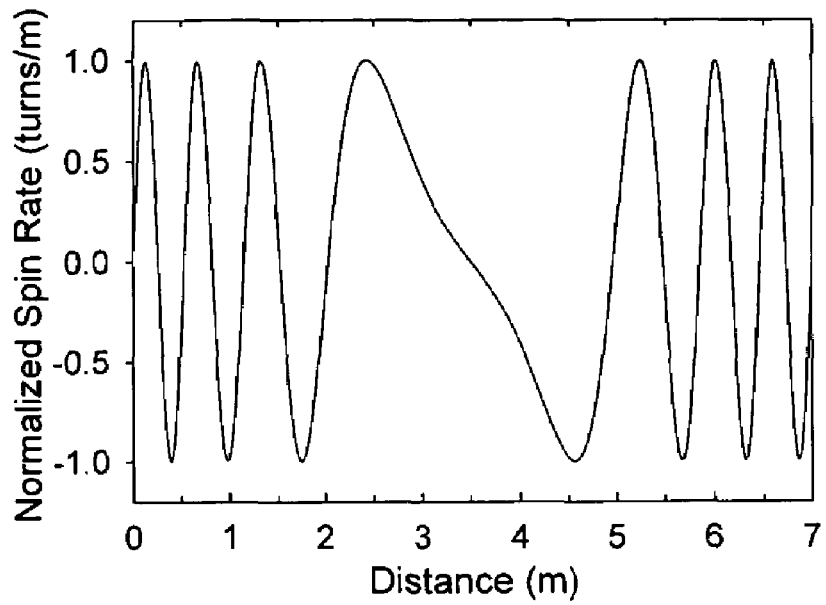
FIG. 16 illustrates an alternate frequency modulated spin profiles as disclosed herein.
Figure 17:
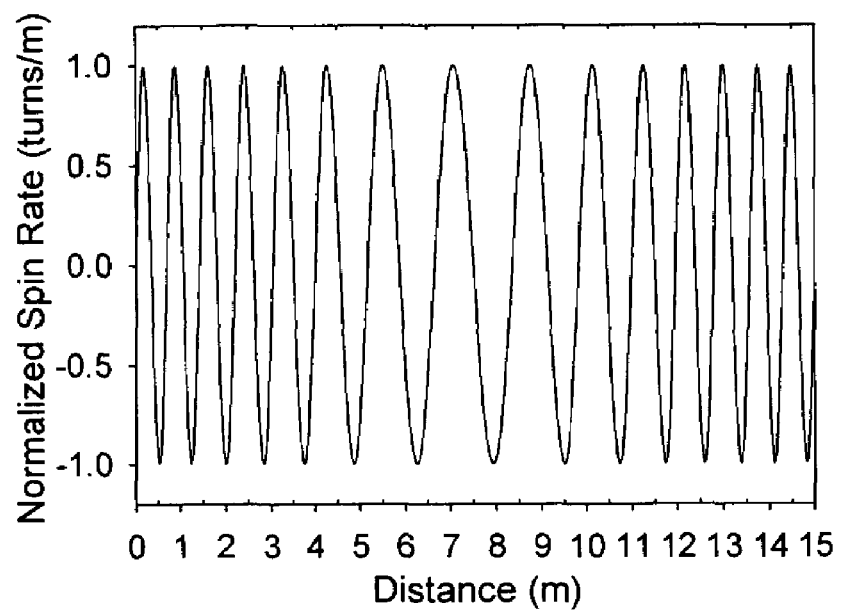
FIG. 17 illustrates another alternate frequency modulated spin profiles as disclosed herein.
Figure 18:
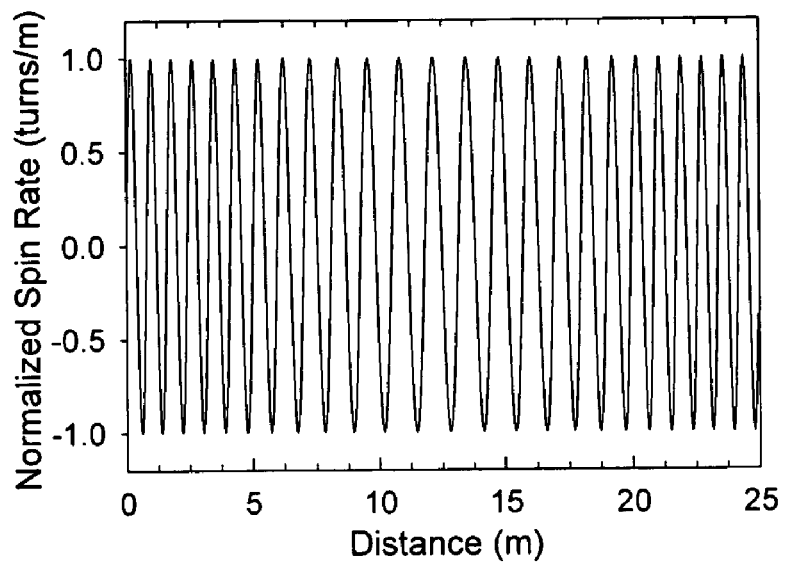
FIG. 18 illustrates yet another alternate frequency modulated spin profiles as disclosed herein.

FIGS. 16–18 illustrate alternate frequency modulated spin profiles as disclosed herein.

In FIG. 16, the minimum spin reversal distance is about 0.6 m, the maximum spin reversal distance is about 2.8 m, and the spin repeat distance is about 7 m. In FIG. 17, the minimum spin reversal distance is about 0.7 m, the maximum spin reversal distance is about 1.7 m, and the spin repeat distance is about 15 m. In FIG. 18, the minimum spin reversal distance is about 0.75 m, the maximum spin reversal distance is about 2.8 m, and the spin repeat distance is about 1.3 m.

The spinning methods disclosed herein are particularly advantageous for optical fibers having long beatlengths. One preferred manufacturing method for making such fibers having long beatlengths is via the outside vapor deposition (OVD) technique. In the outside vapor deposition process, core layers are deposited onto a cylindrical substrate in the form of silica based soot. The central core region is typically first deposited onto a bait rod or mandrel, and the bait rod or mandrel is removed after the soot has been built up to a sufficient thickness to form the central core region. This central core region is then consolidated into a solid glass body, and the centerline hole which was formed by removing the mandrel is closed. For example, the hole may be closed by drawing the consolidated soot core preform into a smaller diameter core cane, thereby closing the hole. The central core region core cane refractive index profile has at least three regions, the central region having refractive index $\Delta_1$, surrounded by a first annular region having refractive index $\Delta_2$, and the second annular region surrounding the first annular region having refractive index $\Delta_3$. Preferably, prior to the deposition of each soot region, the prior core region has been consolidated and redrawn to form a core cane. Such a process, wherein the various core regions are consolidated and redrawn to a narrower core cane prior to having additional soot regions deposited, assists with forming a long beatlength fiber. In addition, because the mandrel that is employed in the initial soot deposition process used to form the central core region is relatively small, the resultant hole that must be closed in the central core region is relatively smaller than may be the case with some other deposition processes (e.g. MCVD). Consequently, OVD in particular is a preferred technique for depositing the soot needed to form the optical fiber preforms used herein. However, the invention is certainly not limited to such preforms, and other methods of deposition may also be employed, such as, for example, MCVD, PCVD, and especially VAD.

EXAMPLES

The invention will be further illustrated by the following examples, which are meant to be exemplary, and not limiting, to the invention.

Example 1

Figure 19:
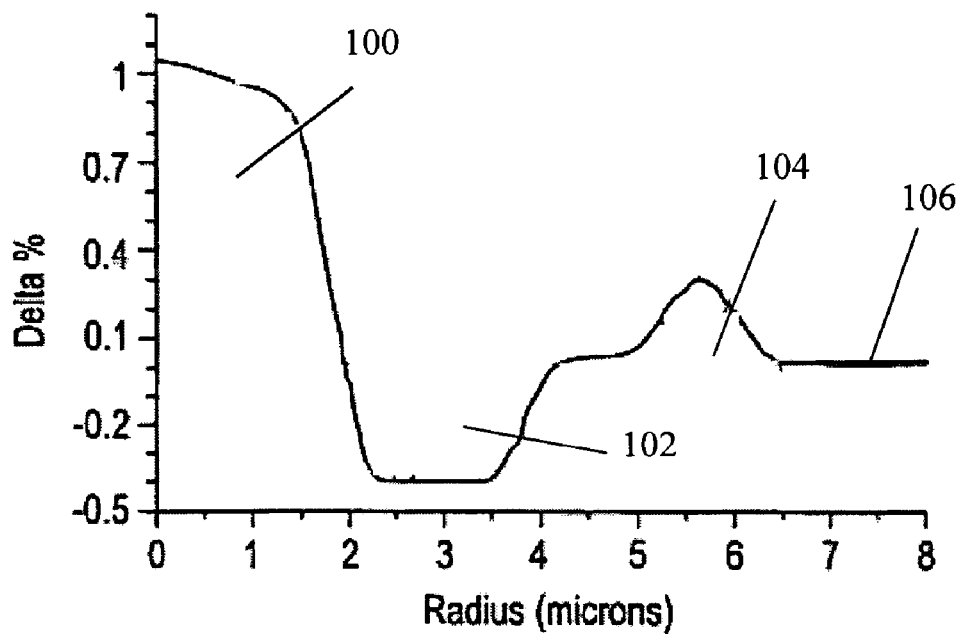
FIG. 19 illustrates the relative refractive index profile of an optical fiber spun as disclosed herein.

A dispersion compensating single-mode optical fiber was manufactured in accordance with a typical fiber draw process, in which an optical fiber preform was first made, and then heated to a temperature at which fiber could be drawn therefrom. For comparison purposes, the same fibers were drawn in both a spun and unspun state. The birefringence properties of the unspun and spun fibers that are used to calculate the PMD reduction factor ideally are assumed to be identical, and the beatlength of these DC fibers was around 1 to 5 m. A section of unspun fibers was drawn, immediately followed by a section of spun fiber, and this pattern was repeated with the same or different spin conditions. The DC fiber has an effective area greater than 20, more preferably greater than 25 $\mu m^2$. This fiber also has a dispersion which is less than about −10, more preferably less than −20 ps/nm-km. This optical fiber also exhibits a slope of about −0.12 ps/nm²-km. The fiber employed a refractive index profile similar to that shown in FIG. 19. As can be seen in FIG. 19, the refractive index profile of the DC fiber employed a three segment core, formed by doping the This optical fiber also exhibits a slope of about −0.12 ps/nm²-km. The fiber employed a refractive index profile similar to that shown in FIG. 19. As can be seen in FIG. 19, the refractive index profile of the DC fiber employed a three segment core, formed by doping the core regions with various amounts of germania and/or fluorine. In particular, the core employed a central core region 100 having a maximum relative refractive index $\Delta_1$ (in %), a second core region 102 contactingly surrounding the first core region 100, having a minimum relative refractive index $\Delta_2$, and a third core region 104 having a maximum relative refractive index $\Delta_3$ and contactingly surrounding the second core region 102. Cladding 106 contactingly surrounds third core region 104. However, the invention is not limited to these types of refractive index profiles, and a wide variety of refractive index profiles could be employed, particularly refractive index profiles having three segments wherein $\Delta_1 > \Delta_3 > \Delta_2$. In FIG. 19, the moat region 102 was doped with fluorine to lower the refractive index to that below the cladding, which preferably is undoped silica. Using the frequency modulated spinning techniques disclosed herein, the PMD of such fibers can be reduced as well as in the case of other optical fiber types, such as non-shifted fiber, non-zero dispersion shifted fiber (NZ-DSF), dispersion shifted fiber (DSF), and others. The fibers were impressed with a spun state having a spin magnitude of 4 turns/meter and a spin repeat distance of 10 m according to the spin profile of FIG. 1. For 30 samples, the average PMD value was 0.0232 ps/km$^{1/2}$, with a standard deviation of 0.00997 and a maximum PMD of 0.043. Thus, using the frequency modulated spin techniques disclosed herein, average PMD values can be maintained below 0.05 ps/km$^{1/2}$, more preferably below 0.03 ps/km$^{1/2}$. PMD values below 0.006 ps/km$^{1/2}$ have been achieved on such DC fibers, using the techniques disclosed herein.

After the fibers were drawn, several one kilometer samples of each were collected on a 30 cm diameter measurement spool with zero winding tension. The large diameter and low winding tension are chosen to reduce the bending induced fiber birefringence or PMD and external perturbation. The differential group delay (DGD) are further measured using polarization analyzer made by Hewlett Packard of model HP8509, which is based on the mechanism called Jones Matrix eigenanalysis to get the DGD and PMD value of the fiber under test. The PMD reduction factor for 50 samples spun according to the frequency modulated spinning technique disclosed herein resulted in an average PMDRF of 0.263 with a standard deviation of 0.169. PMDRF values below 0.06 have been achieved on such DC fibers, using the techniques disclosed herein.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

We claim:

1. An optical fiber exhibiting a beat length greater than about 0.5 meters, having a longitudinal axis with a spin impressed on the fiber, wherein over at least a portion of the fiber the spin impressed on the fiber is alternately clockwise and counter-clockwise, with a spin repeat distance of at least 1 meter and with a plurality of varying spin reversal distances occurring within the spin repeat distance, wherein the plurality of varying spin reversal distances comprises a minimum spin reversal distance and a maximum spin reversal distance.

2. The single mode fiber of claim 1, wherein the fiber exhibits a beat length of between 0.5 m and 5 m, the spin repeat distance is greater than about 10 m, and the resultant PMD from the spin impressed on the fiber is less than 0.1 ps/km$^{1/2}$.

3. The single mode fiber of claim 1, wherein the fiber exhibits a beat length of between 0.5 m and 5 m, the spin repeat distance is greater than about 10 m, and the resultant PMD from the spin impressed on the fiber is less than 0.05 ps/km$^{1/2}$.

4. The single mode fiber of claim 1, wherein the fiber exhibits a beat length of less than 5 m, the spin repeat distance is greater than about 100 m, and the resultant PMD from the spin impressed on the fiber is less than 0.05 ps/km$^{1/2}$.

5. The single mode fiber of claim 1, wherein the fiber exhibits a beat length of greater than 5 m, the spin repeat distance is greater than about 100 m, and the resultant PMD from the spin impressed on the fiber is less than 0.03 $ps/km^{1/2}$.

6. The single mode fiber of claim 1, wherein the fiber exhibits a beat length of greater than 1 m, the spin repeat distance is greater than about 200 m, and the resultant PMD from the spin impressed on the fiber is less than 0.02 $ps/km^{1/2}$.

7. The single mode fiber of claim 1, wherein the fiber exhibits a beat length of greater than 5 m, the spin repeat distance is greater than about 100 m, and the resultant PMD from the spin impressed on the fiber is less than 0.01 $ps/km^{1/2}$.

8. The single mode fiber of claim 1, wherein the fiber exhibits a beat length of greater than 10 m, the spin repeat distance is greater than about 50 m, and the resultant PMD from the spin impressed on the fiber is less than 0.01 $ps/km^{1/2}$.

9. The single mode fiber of claim 1, wherein the fiber comprises a segmented core profile having more than one core segment.

10. The single mode fiber of claim 9, wherein said fiber comprises a core profile having a central segment refractive index $\Delta_1$, an annular segment surrounding the first segment having $\Delta_2$, and a second annular segment surrounding the first annular segment having $\Delta_3$, wherein $\Delta_1 > \Delta_3 > \Delta_2$.

11. A method of making an optical fiber comprising:
heating at least a portion of an optical fiber preform; and
drawing optical fiber from the heated preform such that a spin is impressed on the fiber by applying a torque to the fiber, said torque causing the fiber to undergo rotation around longitudinal axis of the fiber such that the spin is impressed on the fiber as it is drawn from the preform, wherein the optical fiber has a beat length greater than about 0.5 meters, and at least a portion of the spin impressed on the fiber is alternately clockwise and counter-clockwise with a spin repeat distance of at least 1 meter and a plurality of varying spin reversal distances occurring within the spin repeat distance, wherein the plurality of varying spin reversal distances comprises a minimum spin reversal distance and a maximum spin reversal distance.

12. The method of claim 11 wherein the minimum spin reversal distance is greater than 10 cm.

13. The method of claim 11 wherein the ratio of the maximum spin reversal distance divided by the spin repeat distance is less than 0.5.

14. The method of claim 11 wherein the spin repeat distance is greater than 1 m.

15. The method of claim 11 wherein the spin repeat distance is greater than about 10 m and the beat length of the fiber is between about 0.5 and 5 m.

16. The method of claim 11 wherein the spin repeat distance is greater than about 100 m and the beat length of the fiber is greater than about 1 m.

* * * * *